(12) United States Patent
Gomes (10) Patent No.: US 10,210,078 B2
(45) Date of Patent: Feb. 19, 2019

(54) AUTOMATING MANUAL RECONFIGURATION AND VERIFICATION OF A PROCESSING UNIT

(71) Applicant: INTERNATIONAL BUSINESS MACHINES CORPORATION, Armonk, NY (US)

(72) Inventor: Louis P. Gomes, Poughkeepsie, NY (US)

(73) Assignee: INTERNATION BUSINESS MACHINES CORPORATION, Armonk, NY (US)

( * ) Notice: Subject to any disclaimer, the term of this patent is extended or adjusted under 35 U.S.C. 154(b) by 119 days.

(21) Appl. No.: 15/275,606

(22) Filed: Sep. 26, 2016

(65) Prior Publication Data
US 2018/0089073 A1   Mar. 29, 2018

(51) Int. Cl.
*G06F 11/00* (2006.01)
*G06F 11/36* (2006.01)

(52) U.S. Cl.
CPC ...... *G06F 11/3688* (2013.01); *G06F 11/3684* (2013.01)

(58) Field of Classification Search
USPC .................................... 714/37, 38.1
See application file for complete search history.

(56) References Cited

U.S. PATENT DOCUMENTS

| | | | |
|---|---|---|---|
| 7,231,550 B1* | 6/2007 | McGuire | G06F 11/0709 714/26 |
| 8,438,379 B2 | 5/2013 | Hoff et al. | |
| 8,930,904 B2 | 1/2015 | Coronado et al. | |
| 9,582,389 B2 | 2/2017 | Dain | |
| 2005/0021936 A1* | 1/2005 | Bailey | G06F 9/5077 713/100 |

(Continued)

OTHER PUBLICATIONS

Authors et. al.: Disclosed Anonymously, "Method to Increase Productivity and Confiability in Manual Securty Health Checks Execution", PCOM000217629D, May 9, 2012, pp. 1-5.

(Continued)

*Primary Examiner* — Sarai E Butler
(74) *Attorney, Agent, or Firm* — Cantor Colburn LLP; Teddi Maranzano (57) ABSTRACT

Embodiments include methods, reconfiguration and verification systems, and computer program products automating manual reconfiguration and verification process. Aspects include manually configuring processing units (Pus) through LPAR partition's reconfiguration panel using a hardware management console, creating by an computer operating system an MSGLOG API to allow a test program (TP) to communicate with an automation system's automation program (AP), TP generating reconfiguration tests (RT) of PUs and transmitting RTs to AP while holding an MSGLOG API lock, and TP going to sleep for a predetermined time using a sleep timer to allow AP to perform tests, determining whether sleep timer is expired. When sleep timer is expired, print a sleep timer expiration error, and exit. Otherwise, TP obtains states of PUs under RTs, and determine whether results of RTs are correct. When results of RTs are not correct, test program prints reconfiguration test failure error messages, and exit.

20 Claims, 4 Drawing Sheets

(56) References Cited

U.S. PATENT DOCUMENTS

| | | | |
|---|---|---|---|
| 2006/0156289 A1* | 7/2006 | Spinner | G01R 31/31908 |
| | | | 717/124 |
| 2006/0177227 A1* | 8/2006 | Blasko | G01C 1/00 |
| | | | 398/128 |
| 2011/0087874 A1 | 4/2011 | Timashev et al. | |
| 2015/0095608 A1* | 4/2015 | Dusanapudi | G06F 9/5077 |
| | | | 711/173 |
| 2017/0052824 A1 | 2/2017 | Sharma et al. | |

OTHER PUBLICATIONS

Authors et. al.: Disclosed Anonymously, "Probationary Configuration Change Process to Prevent Loss of System Control", IPCOM000236304D, Apr. 17, 2014, pp. 1-3.

* cited by examiner

AUTOMATING MANUAL RECONFIGURATION AND VERIFICATION OF A PROCESSING UNIT

BACKGROUND

The present disclosure relates generally to hardware testing of computer systems, and more particularly to methods, verification systems, and computer program products of automating manual reconfiguration and verification of processing units of computer systems.

Traditionally software does not include an application program interface (API) to directly communicate with hardware or firmware layer(s) of a computer system that is configured to perform reconfiguration and verification of a processing unit (PU) like channel attached cryptographic card for security reasons. Therefore, the reconfiguration of a processing unit can only be done manually by a computer operator via a logical partition (LPAR) Partition's (LP) support element (SE) of the computer system. As a result, the verification of the reconfiguration of the processing unit can only be done manually by running specific static test case(s) on the computer system.

Therefore, heretofore unaddressed needs still exist in the art to address the aforementioned deficiencies and inadequacies.

SUMMARY

In one aspect, the present disclosure relates to a method of automating manual reconfiguration and verification process. In certain embodiments, the method may include: a computer operator of a computer system manually configuring one or more processing units of the computer system through a logical partition (LPAR) partition's reconfiguration panel using a hardware management console, an operating system of the computer system creating a message log (MSGLOG) application program interface (API) to allow a test program (TP) to communicate with an automation program (AP) of an automation system, the test program generating one or more reconfiguration tests (RT) for the automation program of the automation system to perform the reconfiguration tests of the processing units of the computer system configured by the computer operator, the test program transmitting the reconfiguration tests generated to the automation program of the automation system, while holding an MSGLOG API lock, and the test program going to sleep for a predetermined period of time using a sleep timer, the operating system determining whether the sleep timer is expired. When the sleep timer is expired, the operating system may print a sleep timer expiration error, and end the automating manual reconfiguration and verification process. When the sleep timer is not expired, the test program may obtain states of the one or more processing units that are subject to the one or more reconfiguration tests, and determine whether results of the one or more reconfiguration tests are correct. When the results of the one or more reconfiguration tests are correct, the computer system may end the automating manual reconfiguration and verification process. When the results of the one or more reconfiguration tests are not correct, the test program may print one or more reconfiguration test failure error messages for error analysis and correction, and ending the automating manual reconfiguration and verification process.

In certain embodiments, the method may further include: the automation program receiving the one or more reconfiguration tests request from the test program through the MSGLOG API, while the automation program holding the MSGLOG API lock, the automation program performing the one or more reconfiguration tests request manually on the one or more processing units of the computer system using an LPAR partition's reconfiguration panels of the computer's support element, and the automation program waking the test program up immediately after the one or more reconfiguration tests request are completed.

In another aspect, the present disclosure relates to a reconfiguration and verification system. The reconfiguration and verification system may include a computer system, a support element of the computer system, an automation system, and a hardware management console. The computer system may include one or more computers, each of the one or more computers having at least one processor, and a non-transitory storage medium (memory) storing an operating system, and a test program. When executed by the at least one processor, the test program may cause the processor to perform a method of an automating manual reconfiguration and verification process.

In certain embodiments, the operating system of the computer system may be configured to create a message log (MSGLOG) application program interface (API) to allow the test program to communicate with the automation program of the automation system. In certain embodiments, the test program may be configured to: generate the one or more reconfiguration tests (RT) for the automation program of the automation system to perform the reconfiguration tests of the processing units of the computer system, transmit the reconfiguration tests generated to the automation program of the automation system via the MSGLOG API, while holding an MSGLOG API lock of the MSGLOG API, and go to sleep for a predetermined period of time using a sleep timer. The test program is further configured to: receive states of the one or more processing units that are subject to the one or more reconfiguration tests, verify test results of the one or more reconfiguration tests, and generate any reconfiguration and verification failures to the computer system. In certain embodiments, the automation program is configured to: receive the one or more reconfiguration tests request from the test program through the MSGLOG API, while the automation program holding the MSGLOG API lock, perform the one or more reconfiguration tests request manually on the one or more processing units of the computer system using an LPAR partition's reconfiguration panels of the computer's support element, and wake the test program up immediately after the one or more reconfiguration tests request are completed.

In yet another aspect, the present disclosure relates to a computer program product operable on a computer system of a reconfiguration and verification system. In certain embodiments, the computer system may include a processor and the non-transitory computer storage medium configured to store an operating system, a test program (TP) and computer executable instructions for execution by the processor of the computer system for performing a method of automating manual reconfiguration and verification. The method may include: a computer operator of the computer system manually configuring one or more processing units of the computer system through a logical partition (LPAR) partition's reconfiguration panel using a hardware management console, an operating system of the computer system creating a message log (MSGLOG) application program interface (API) to allow a test program (TP) to communicate with an automation program (AP) of an automation system, the test program generating one or more reconfiguration tests (RT) for the automation program of the automation system to perform the reconfiguration tests of the processing units of the computer system reconfigured by the computer operator, the test program transmitting the reconfiguration tests generated to the automation program of the automation system, while holding an MSGLOG API lock, and the test program going to sleep for a predetermined period of time using a sleep timer, the operating system determining whether the sleep timer is expired. When the sleep timer is expired, the operating system may print a sleep timer expiration error, and end the automating manual reconfiguration and verification process. When the sleep timer is not expired, the test program may obtain states of the one or more processing units that are subject to the one or more reconfiguration tests, and determine whether results of the one or more reconfiguration tests are correct. When the results of the one or more reconfiguration tests are correct, the computer system may end the automating manual reconfiguration and verification process. When the results of the one or more reconfiguration tests are not correct, the test program may print one or more reconfiguration test failure error messages for error analysis and correction, and ending the automating manual reconfiguration and verification process.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the present disclosure is particularly pointed out and distinctly claimed in the claims at the conclusion of the specification. The foregoing and other features and advantages of the present disclosure are apparent from the following detailed description taken in conjunction with the accompanying drawings in which:

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The term "LPAR" means logical partition, and an LPAR is the division of a computer processor, memory, and storage into multiple sets of resources so that each set of resources can be operated independently with its own operating system instance and applications.

"Hardware Management Console" or HMC is a Physical/Virtual appliance used to manage IBM Systems including IBM System i, IBM System p, IBM System z, and IBM Power Systems.

"Support Element" is the most direct and lowest level way to access a computer system, especially a mainframe computer system. It circumvents even the Hardware Management Console and the operating system running on the computer.

The term "processing unit" is the amount of physical processor capability an LPAR will get. The processing unit also describes the amount of CPU time available for the LPAR in a timeslice. For example, if the duration of one timeslice is 10 ms, the LPAR would get up to 40 ms from a shared processor pool that includes four processors. Any unused CPU cycles would remain in the shared pool which can be further used by uncapped LPARS The term computer program, as used above, may include software, firmware, and/or microcode, and may refer to programs, routines, functions, classes, and/or objects. The term shared, as used above, means that some or all code from multiple modules may be executed using a single (shared) processor.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings FIGS. 1-4, in which certain exemplary embodiments of the present disclosure are shown. The present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Figure 1:
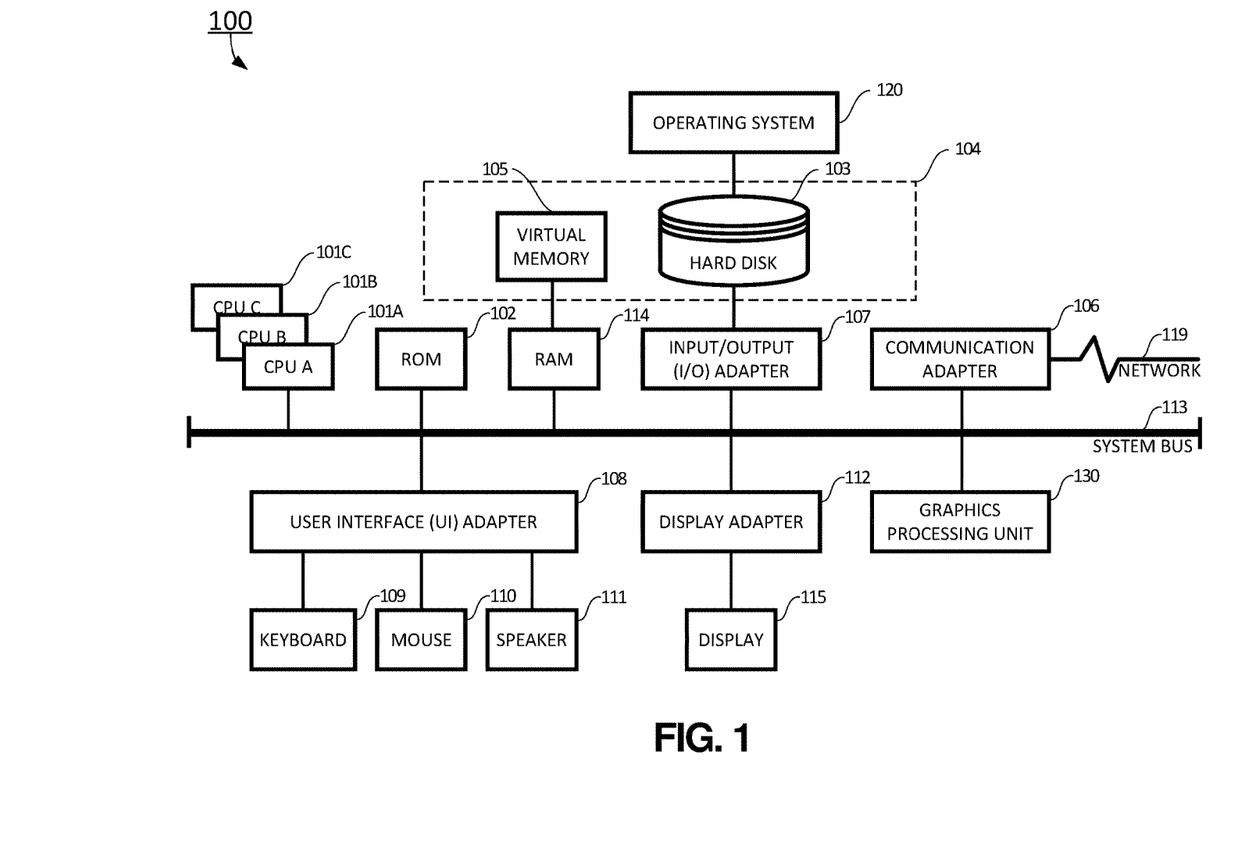
FIG. 1 is a block diagram illustrating an exemplary computer system of automating manual reconfiguration and verification of a processing unit of the computer system according to certain embodiments of the present disclosure.

Referring to FIG. 1, there is shown an embodiment of a computer system 100 of automating manual reconfiguration and verification of the processing unit of the computer system performing adaptive testing using dynamically determined system resources of the computer system 100 and implementing the teachings herein. In this embodiment, the computer system 100 has one or more central processing units (CPU, or processors) 101A, 101B, 101C, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of the computer system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the computer system 100 may be stored in mass storage 104. A network adapter 106 interconnects bus 113 with an outside network 116 enabling the computer system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O buses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the computer system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the computer system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1. In certain embodiments, the network 116 may include symmetric multiprocessing (SMP) bus, a Peripheral Component Interconnect (PCI) bus, local area network (LAN), wide area network (WAN), telecommunication network, wireless communication network, and the Internet. In certain embodiments, the computer system 100 may include an IBM z-system mainframe computer.

Embodiments include methods for configuring or reconfiguring (hereinafter reconfiguration is used to cover configuration or reconfiguration) hardware and to perform reconfiguration tests via special purpose application program interface (API). The reconfiguration tests are used to verify that the configurations or reconfigurations were made properly. In exemplary embodiments, a test program (TP) and an automation program (AP) are used to simulate dynamic device reconfiguration using manual device reconfiguration.

Figure 2:
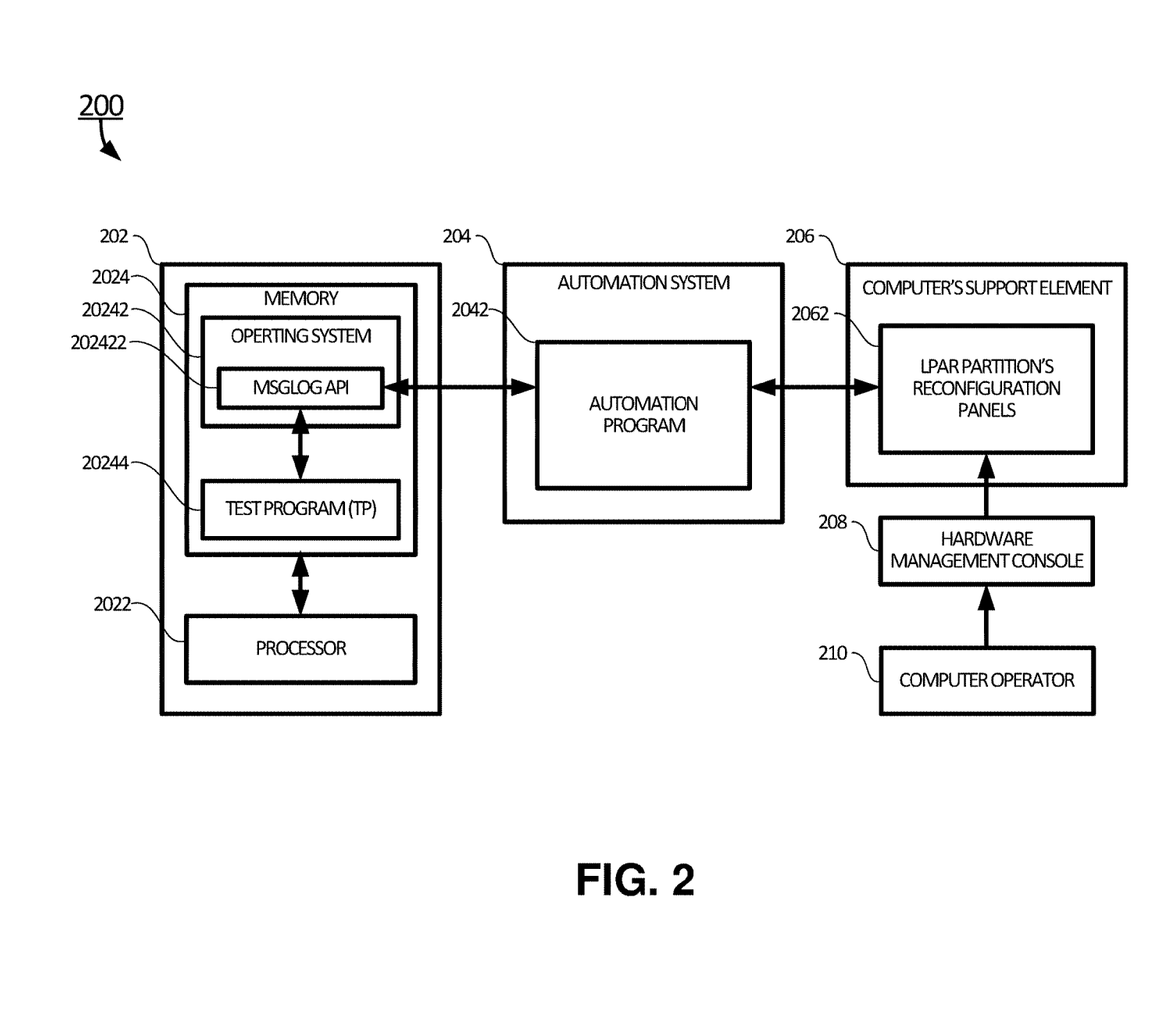
FIG. 2 is a block diagram of an exemplary reconfiguration and verification system of the processing unit of the computer system according to certain exemplary embodiments of the present disclosure.

In one aspect, the present disclosure relates to a reconfiguration and verification system 200 as shown in FIG. 2. In certain embodiments, the reconfiguration and verification system 200 includes a computer system 202, a support element 206 of the computer system 202, an automation system 204, and a hardware management console 208. The computer system 202 includes one or more computers, each of the one or more computers having at least one processor 2022, and a non-transitory storage medium (memory) 2024 storing an operating system 20242, and a test program 20244. When executed by the at least one processor 2022, the test program 20244 causes the processor 2022 to perform a method of an automating manual reconfiguration and verification process.

In certain embodiments, the support element 206 of the computer system 202 accesses, configures, reconfigures and tests one or more processing units (PU) of the computer system 202. The access of the processing unit by the support element is performed in a direct manner and via the lowest level communication channel available. For example, hypervisor communication channel, capacity purchased (CP) firmware, and input/output (I/O) subsystem firmware, and various device drivers. The automation system 204 includes at least an automation program (AP) 2042 for performing one or more reconfiguration tests on the one or more processing units of the computer system 202. The hardware management console 208 allows a computer operator 210 to configure or reconfigure the processing units of the computer system 202 via a logical partition (LPAR) partition's reconfiguration panel of the support element 206 of the computer system 202.

In certain embodiments, a message log (MSGLOG) application program interface (API) is added to the operating system 20242 of the computer system 202. Such an API allows the test program 20244 to communicate with the automation program 2042 of the automation system 204 directly. The test program performs various types of reconfiguration tests to verify whether the reconfigurations of the processing units of the computer system 202 were made properly.

In certain embodiments, the processing units include various adapters installed in a computer system. For example, on an IBM mainframe computer, current encryption system of the z System machine uses Crypto Express5 (CEX5S) adapters, and the next z System machine will use Crypto Express5 (CEX5S) adapters as well as new Crypto Express6 (CEX6S) adapters. The z System has previously used Crypto Express2 adapters (CEX2), Crypto Express3 adapters (CEX3) and Crypto Express4 (CEX4S) adapters. Each Crypto Express adapter may be configured to operate in one of three modes: CCA (Common Cryptographic Architecture) Coprocessor, Accelerator, or EP11 (Enterprise PKCS #11) Coprocessor. The Crypto Express4 adapter is the first adapter that can be configured as an EP11 Coprocessor. A suffix is used (after the digit) to indicate the adapter mode (C=CCA Coprocessor, A=Accelerator, and P=EP11 Coprocessor). For example, the Crypto Express4 adapter configured as a CCA Coprocessor is called CEX4C, the Crypto Express4 adapter configured as an Accelerator is called CEX4A, and the Crypto Express4 adapter configured as an EP11 Coprocessor is called CEX4P.

In certain embodiments, the reconfiguration includes bringing certain processing units online, or taking certain processing units offline, bringing certain processing units in service, or taking certain processing units out of service, changing the operation domain of the processing units, controlling many different processing units of the computer system 202, and controlling operation modes of the different processing units. In exemplary embodiments, a processing unit can be programmed into several different modes of operation to perform different functions. In exemplary embodiments, the processing unit may include different types of engines to perform different types of functions. For example, the processing unit may include operation mode such as common cryptographic architecture (CCA) or CCA coprocessor, accelerator, and Enterprise PKCS #11 (EP11) coprocessor.

In an exemplary embodiment, the operation domain of a processing unit includes a usage domain and control domain of the processing unit. The usage domain only allows the operator to access certain processing units, while the control domain allows the operator to control or make changes to certain processing units. For example, when the processing units is a common cryptographic adapter (CCA), the operating system and the application/test programs (aka software) in the usage domain can access the common cryptographic adapter with the cryptographic master key given, while the operator in the control domain can change or control the cryptographic master key of the common cryptographic adapter.

In certain embodiments, for example, the reconfiguration can include bringing a first processing unit online, taking a second processing unit offline, keeping a third processing unit unchanged, changing the operation domain of next five different processing units to usage domain, and changing the operation modes of the next 10 processing units to CCA.

In certain embodiments, the test program 20244 generates one or more reconfiguration tests (RT) for the automation program 2042 of the automation system 204. The test program 20244 then transmits the reconfiguration tests generated to the automation program 2042 of the automation system 204 via the MSGLOG API 202422. During the transmission, the test program 20244 holds an MSGLOG API lock of the MSGLOG API 202422. Then the test program 20244 goes to sleep for a predetermined period of time using a sleep timer to allow the automation program 2042 of the automation system 204 to perform the reconfiguration tests on the LPAR partition's reconfiguration panels 2062 of the computer's support element 206.

In certain embodiments, the sleep timer should be set sufficiently long so that the automation program 2042 can complete the one or more reconfiguration tests generated. For example, if the complete reconfiguration tests may require 5 minutes to finish, and the sleep timer is set to 3 minutes, then the automation program 2042 may not have enough time to finish the reconfiguration test generated, and false error message may be printed out due to the sleep timer is not set long enough to allow the automation program 2042 to complete the reconfiguration tests. In this case, either the number of reconfiguration tests generated should be reduced, or the sleep timer should be extended, until the automation program 2042 has sufficient time to complete the reconfiguration tests. In certain embodiments, in order to avoid false error messages, the sleep timer is usually set much longer than it actually takes for the automation program 2042 to all reconfiguration tests.

In certain embodiments, one or more reconfiguration tests fail when the sleep timer expires, and one or more reconfiguration tests succeed when the test program 20244 is awakened by the automation program 2042 immediately after the one or more reconfiguration tests request are completed.

The test program 20244 is further configured to receive the states of the one or more processing units that are subject to the one or more reconfiguration tests, verify test results of the one or more reconfiguration tests, and generate any reconfiguration and verification failures to the computer system 202.

In certain embodiments, the automation program 2042 is configured to receive the one or more reconfiguration tests request from the test program 20244 through the MSGLOG API 202422, while the automation program 2042 holding the MSGLOG API lock, perform the one or more reconfiguration tests request manually on the one or more processing units of the computer system 202 using an LPAR partition's reconfiguration panels 2062 of the computer's support element 206, and wake the test program 20244 up immediately after the one or more reconfiguration tests request are completed.

In certain embodiments, the reconfiguration and verification system 200 is modular, and the functions of the reconfiguration and verification system 200 described here may be turned off by the computer operator 210 to ensure safety and security of the computer system 202.

In another aspect, the present disclosure relates to a method of automating manual reconfiguration and verification process. In certain embodiments, the method may include one or more of: a computer operator 210 of a computer system 202 manually configuring one or more processing units of the computer system 202 through a logical partition (LPAR) partition reconfiguration panel 2062 using a hardware management console 208, an operating system 20242 of the computer system 202 creating a message log (MSGLOG) application program interface (API) 202422 to allow a test program (TP) 20244 to communicate with an automation program (AP) 2042 of an automation system 204, the test program 20244 generating one or more reconfiguration tests (RT) for the automation program 2042 of the automation system 204 to perform the reconfiguration tests of the processing units of the computer system 202 reconfigured by the computer operator 210, the test program 20244 transmitting the reconfiguration tests generated to the automation program 2042 of the automation system 204, while holding an MSGLOG API lock, and the test program 20244 going to sleep for a predetermined period of time using a sleep timer, the operating system 20242 determining whether the sleep timer is expired.

In certain embodiments, when the sleep timer is expired, the operating system 20242 may print a sleep timer expiration error, and end the automating manual reconfiguration and verification process. When the sleep timer is not expired, the test program 20244 may obtain states of the one or more processing units that are subject to the one or more reconfiguration tests, and determine whether results of the one or more reconfiguration tests are correct.

In certain embodiments, when the results of the one or more reconfiguration tests are correct, the computer system 202 may end the automating manual reconfiguration and verification process. When the results of the one or more reconfiguration tests are not correct, the test program 20244 may print one or more reconfiguration test failure error messages for error analysis and correction, and ending the automating manual reconfiguration and verification process.

In certain embodiments, the method may further include: the automation program 2042 receiving the one or more reconfiguration tests request from the test program 20244 through the MSGLOG API 202422, while the automation program 2042 holding the MSGLOG API lock, the automation program 2042 performing the one or more reconfiguration tests request manually on the one or more processing units of the computer system 202, and the automation program 2042 waking the test program 20244 up immediately after the one or more reconfiguration tests request are completed.

In certain embodiments, when the results of the one or more reconfiguration tests are correct, the computer system 202 may end the automating manual reconfiguration and verification process after the automation program 2042 transmitting the verified results of the one or more reconfiguration tests to the test program 20244 through the MSGLOG API 202422. The MSGLOG API 202422 allows the test program 20244 to perform reconfiguration test manually using the automation program 2042 through the MSGLOG API 202422. In certain embodiments, the MSGLOG API 202422 may include an MSGLOG buffer. When the MSGLOG buffer is updated, the MSGLOG API lock should be held to avoid seeing partial or overwritten entries. The MSGLOG API lock should not be held while holding other computer system 202 and/or device locks to avoid system contention, deadlock detection, and deadlock recovery.

Figure 3:
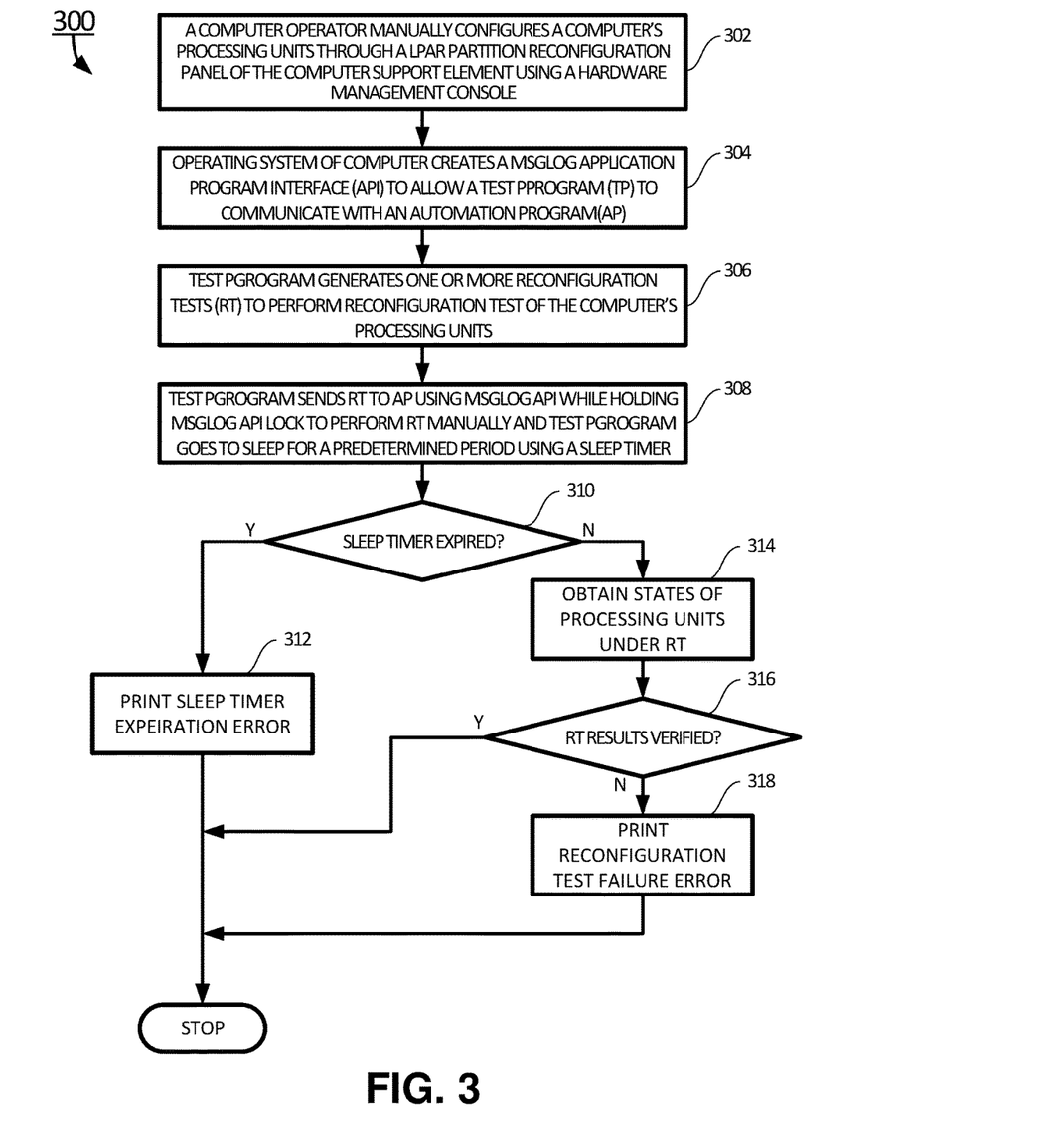
FIG. 3 is a flowchart of an exemplary method of automating manual reconfiguration and verification of the processing unit of the computer system according to certain embodiments of the present disclosure.

Referring now to FIG. 3, a flowchart of an exemplary method 300 of automating manual reconfiguration and verification of the processing unit of the computer system is shown according to certain embodiments of the present disclosure. As shown at block 302, the computer operator 210 of the computer system 202 manually configures one or more processing units of the computer system 202 through a logical partition (LPAR) partition reconfiguration panel 2062 of a computer support element 206 using a hardware management console 208. Next, as shown at block 304, the operating system 20242 of the computer system 202 creates a message log (MSGLOG) application program interface (API) 202422 to allow the test program (TP) 20244 to communicate with the automation program (AP) 2042 of the automation system 204. The MSGLOG API 202422 can be used by the automation program 2042 to receive one or more reconfiguration tests information from the test program 20244, and perform the one or more reconfiguration tests on the processing units. Otherwise, the test program 20244 may not be able to send the one or more reconfiguration tests to the automation program 2042, and the automation program 2042 will not be able to perform the one or more reconfiguration tests on the processing units of the computer system 202.

The method 300 also includes, as shown at block 306, the test program 20244 generating the one or more reconfiguration tests (RT) for the automation program 2042 of the automation system 204 to perform the reconfiguration tests of the processing units of the computer system 202 configured by the computer operator 210. Next, as shown at block 308, the test program 20244 transmits the one or more reconfiguration tests generated to the automation program 2042 of the automation system 204 through the MSGLOG API 202422. During the transmission, the operating system 20242 must hold the MSGLOG API lock so that any other computer system or other devices may not access the MSGLOG API 202422 so that the transmission may not be interrupted. After the transmission of the one or more reconfiguration tests to the automation program 2042 is completed, the test program 20244 may go to sleep for a predetermined period of time using the sleep timer.

In certain embodiments, the sleep timer should be set sufficiently long so that the automation program 2042 can complete the one or more reconfiguration tests generated. For example, if the complete reconfiguration tests may require 5 minutes to finish, and the sleep timer is set to 3 minutes, then the automation program 2042 may not have enough time to finish the reconfiguration test generated, and false error message may be printed out due to the sleep timer is not set long enough to allow the automation program 2042 to complete the reconfiguration tests. In this case, either the number of reconfiguration tests generated should be reduced, or the sleep timer should be extended, until the automation program 2042 has sufficient time to complete the reconfiguration tests. In certain embodiments, in order to avoid false error messages, the sleep timer is usually set much longer than it actually takes for the automation program 2042 to perform all reconfiguration tests.

The method 300 also includes, as shown at query block 310, the operating system 20242 determining whether the sleep timer is expired. When the sleep timer is expired, the method 300 proceeds to block 312. Otherwise, the method 300 proceeds to block 314. At block 312, the sleep timer is expired before the automation program 2042 completes the one or more reconfiguration tests generated by the test program 20244, the operating system 20242 prints a sleep timer expiration error, and end the automating manual reconfiguration and verification process. As shown at block 314, when the sleep timer is not expired, the test program 20244 receives states of the one or more processing units that are subject to the one or more reconfiguration tests by querying the states of one or more processing units that are subject to one or more reconfiguration test using the operating system 20242 of the computer system 202 and then gathering the query results.

In certain embodiments, as shown at block 316, the test program 20244 determines whether results of the one or more reconfiguration tests are correct. When the results of the one or more reconfiguration tests are correct, the method proceeds to end the automating manual reconfiguration and verification process. When the results of the one or more reconfiguration tests are not correct, the method proceeds to block 318 and the test program 20244 prints one or more reconfiguration test failure error messages for error analysis and correction. The method ends the automating manual reconfiguration and verification process.

Figure 4:
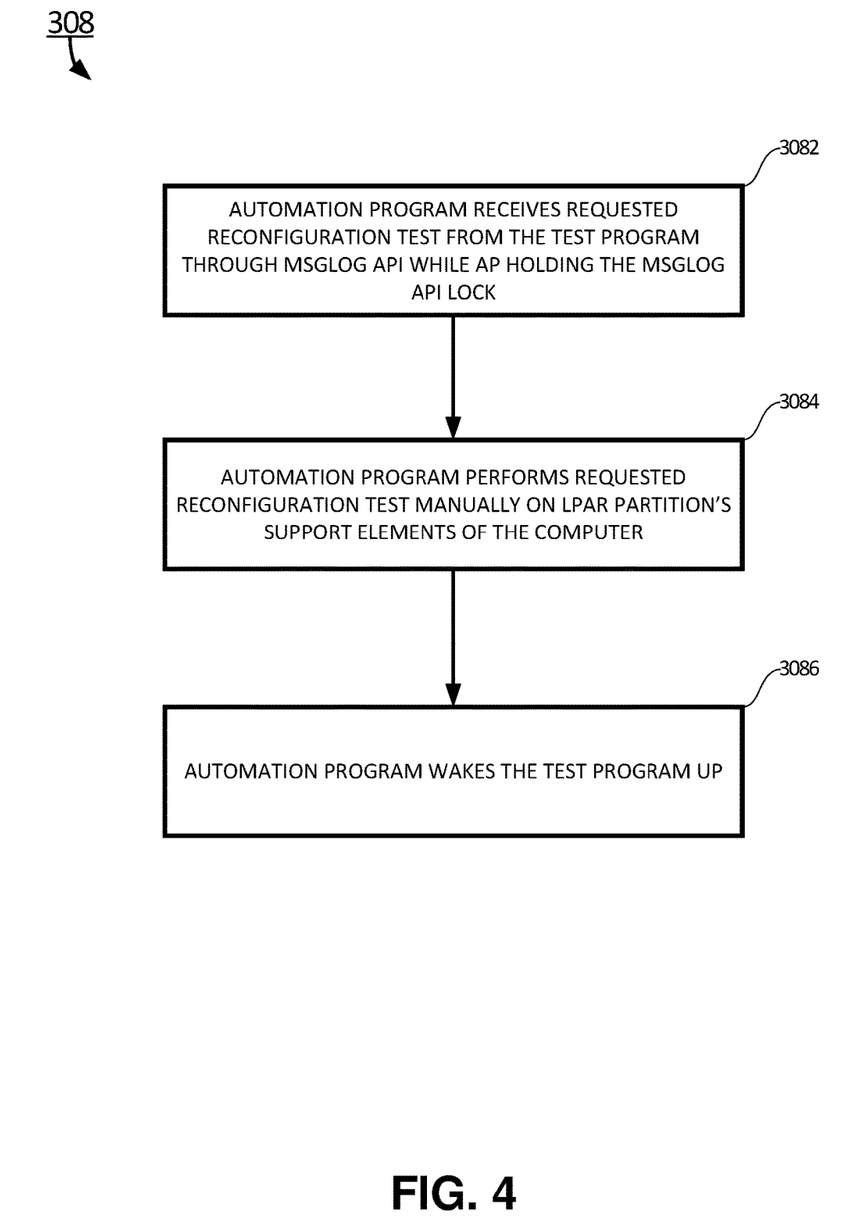
FIG. 4 is a detailed flow chart of a block of the exemplary method of automating manual reconfiguration and verification of the processing unit of the computer system according to certain embodiments of the present disclosure.

Referring now to FIG. 4, a detailed flow chart of a block 308 of the exemplary method 300 of automating manual reconfiguration and verification of the processing unit of the computer system is shown according to certain embodiments of the present disclosure. As shown at block 3082, the automation program 2042 receives the one or more reconfiguration tests generated by the test program 20244 and transmitted through the MSGLOG API 202422, while holding the MSGLOG API lock. Next, as shown at block 3084, the automation program 2042 manually performs the one or more reconfiguration tests received using the support element 206 of the computer system 202. The method 300 also includes, the automation program 2042 waking the test program 20244 up immediately after the one or more reconfiguration tests request are completed, as shown at block 3086.

In yet another aspect, the present disclosure relates to a computer program product operable on a computer system 202 of a reconfiguration and verification system 200. In certain embodiments, the computer system 202 may include a processor 2022 and a non-transitory computer storage medium 2024 configured to store an operating system 20242, a test program (TP) 20244 and computer executable instructions for execution by the processor 2022 of the computer system 202 for performing a method of automating manual reconfiguration and verification. In an exemplary embodiment, the method includes: a computer operator 210 of the computer system 202 manually configures one or more processing units of the computer system 202 through a logical partition (LPAR) partition reconfiguration panel 2062 using a hardware management console 208. An operating system 20242 of the computer system 202 creates a message log (MSGLOG) application program interface (API) 202422 to allow a test program (TP) 20244 to communicate with an automation program (AP) 2042 of an automation system 204. The test program 20244 generates one or more reconfiguration tests (RT) and transmits the reconfiguration tests generated to the automation program 2042 of the automation system 204 to perform the reconfiguration tests of the processing units of the computer system 202 reconfigured by the computer operator 210. The test program 20244 holds an MSGLOG API lock during the transmission of the reconfiguration tests generated. After the transmission, the test program 20244 goes to sleep for a predetermined period of time using a sleep timer to allow the automation system 204 to perform the reconfiguration tests.

In certain embodiments, the operating system 20242 determines whether the sleep timer is expired. When the sleep timer is expired, the operating system 20242 prints a sleep timer expiration error, and end the automating manual reconfiguration and verification process. When the sleep timer is not expired, the test program 20244 obtains states of the one or more processing units that are subject to the one or more reconfiguration tests, and determines whether results of the one or more reconfiguration tests are correct. When the results of the one or more reconfiguration tests are correct, the computer system 202 ends the automating manual reconfiguration and verification process. Otherwise, the test program 20244 prints one or more reconfiguration test failure error messages for error analysis and correction, and ending the automating manual reconfiguration and verification process.

In certain embodiments, the method may further include the automation program 2042 receiving the one or more reconfiguration tests request from the test program 20244 through the MSGLOG API 202422, while the automation program 2042 holding the MSGLOG API lock, the automation program 2042 performing the one or more reconfiguration tests request manually on the one or more processing units of the computer system 202, and the automation program 2042 waking the test program 20244 up immediately after the one or more reconfiguration tests request are completed.

In certain embodiments, when the results of the one or more reconfiguration tests are correct, the computer system 202 may end the automating manual reconfiguration and verification process after the automation program 2042 transmitting the verified results of the one or more reconfiguration tests to the test program 20244 through the MSGLOG API 202422. The MSGLOG API 202422 allows the test program 20244 to perform manually using the automation program 2042 through the MSGLOG API 202422. In certain embodiments, the MSGLOG API 202422 may include an MSGLOG buffer. When the MSGLOG buffer is updated, the MSGLOG API lock should be held to avoid seeing partial or overwritten entries. The MSGLOG API lock should not be held while holding other computer system 202 and/or device locks to avoid system contention, deadlock detection and deadlock recovery.

The present disclosure may be a computer system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions available for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of automating manual reconfiguration and verification process, comprising:
    configuring, by a computer operator of a computer system, one or more processing units of the computer system through a logical partition (LPAR) partitions reconfiguration panel;
    creating, by an operating system of the computer system, a message log (MSGLOG) application program interface (API) that enables communication between a test program (TP) with an automation program (AP) of an automation system;
    generating, by the test program, one or more reconfiguration tests (RT) for the automation program of the automation system to perform the one or more reconfiguration tests of the one or more processing units of the computer system configured by the computer operator;
    transmitting, by the test program, the one or more reconfiguration tests generated to the automation program of the automation system, while holding an MSGLOG API lock; and
    performing, by the automation program, the one or more reconfiguration tests after the test program goes to sleep for a predetermined period of time using a sleep timer.

2. The method of claim 1, further comprising:
    determining, by the operating system, whether the sleep timer is expired;
    responsive to the operating system determining the sleep timer is expired, the operating system printing a sleep timer expiration error, and ending the automating manual reconfiguration and verification process; and
    responsive to the operating system determining the sleep timer is not expired, obtaining, by the test program, states of the one or more processing units that are subject to the one or more reconfiguration tests, and determining whether results of the one or more reconfiguration tests are correct; and printing one or more reconfiguration test failure error messages for error analysis and correction when the results of the one or more reconfiguration tests are not correct.

3. The method of claim 1, wherein the transmitting comprises:
receiving, by the automation program, the one or more reconfiguration tests request from the test program through the MSGLOG API;
performing, by the automation program, the one or more reconfiguration tests request manually on the one or more processing units of the computer system using an LPAR partition's reconfiguration panels of a support element; and
waking, by the automation program, the test program up before the sleep timer expires.

4. The method of claim 1, wherein when results of the one or more reconfiguration tests are correct, the computer system ending the automating manual reconfiguration and verification process after the automation program transmitting the verified results of the one or more reconfiguration tests to the test program through the MSGLOG API.

5. The method of claim 1, wherein the MSGLOG API allows the test program to perform automatically the one or more reconfiguration tests using the automation program through the MSGLOG API.

6. The method of claim 1, wherein the MSGLOG API comprises an MSGLOG buffer, and wherein updating the MSGLOG buffer comprising holding the MSGLOG API lock to avoid seeing partial or overwritten entries.

7. The method of claim 6, wherein the MSGLOG API lock should not be held while holding other computer system and/or device locks to avoid system contention, deadlock detection and deadlock recovery.

8. A reconfiguration and verification system, comprising:
a computer system, wherein the computer system comprises one or more computers, each of the one or more computers having a processor, and a non-transitory storage medium 2024 storing an operating system, and computer executable instructions, when executed at the processor, the computer executable instructions cause the processor to perform a method of an automating manual reconfiguration and verification process;
a support element of the computer system configured to access, reconfigure and test one or more processing units of the computer system in a direct and the lowest level way;
an automation system having an automation program (AP) for performing one or more reconfiguration tests on the one or more processing units of the computer system; and
a hardware management console configured to allow a computer operator to configure the one or more processing units of the computer system via a logical partition (LPAR) partition's reconfiguration panel of the support element of the computer system.

9. The reconfiguration and verification system of claim 8, wherein the operating system is configured to create a message log (MSGLOG) application program interface (API) to allow a test program to communicate with the automation program of the automation system.

10. The reconfiguration and verification system of claim 9, wherein the test program is configured to:
generate the one or more reconfiguration tests (RT) for the automation program of the automation system to perform the one or more reconfiguration tests of the one or more processing units of the computer system;
transmit the one or more reconfiguration tests generated to the automation program of the automation system via the MSGLOG API, while holding an MSGLOG API lock of the MSGLOG API; and
go to sleep for a predetermined period of time using a sleep timer.

11. The reconfiguration and verification system of claim 10, wherein the test program is further configured to:
receive states of the one or more processing units that are subject to the one or more reconfiguration tests;
verify test results of the one or more reconfiguration tests; and
generate any reconfiguration and verification failures to the computer system.

12. The reconfiguration and verification system of claim 10, wherein one or more reconfiguration tests fail when the sleep timer expires.

13. The reconfiguration and verification system of claim 10, wherein one or more reconfiguration tests succeed when the test program is waken by the automation program immediately after the one or more reconfiguration tests request are completed.

14. The reconfiguration and verification system of claim 10, wherein the automation program is configured to:
receive the one or more reconfiguration tests request from the test program through the MSGLOG API, while the automation program holding the MSGLOG API lock;
perform the one or more reconfiguration tests request manually on the one or more processing units of the computer system using an LPAR partition's reconfiguration panels of the computer's support element; and
wake the test program up immediately after the one or more reconfiguration tests request are completed.

15. A computer program product operable on a computer system of a reconfiguration and verification system comprising a processor and the computer storage medium configured to store an operating system, a test program (TP) and computer executable instructions for execution by the processor of the computer system for performing a method of automating manual reconfiguration and verification, the method comprising:
configuring, by a computer operator of a computer system, one or more processing units of the computer system through a logical partition (LPAR) partitions reconfiguration panel;
creating, by an operating system of the computer system, a message log (MSGLOG) application program interface (API) that enables communication between a test program (TP) with an automation program (AP) of an automation system;
generating, by the test program, one or more reconfiguration tests (RT) for the automation program of the automation system to perform the one or more reconfiguration tests of the one or more processing units of the computer system configured by the computer operator;
transmitting, by the test program, the one or more reconfiguration tests generated to the automation program of the automation system, while holding an MSGLOG API lock; and
performing, by the automation program, the one or more reconfiguration tests after the test program goes to sleep for a predetermined period of time using a sleep timer.

16. The computer program product of claim 15, wherein the method further comprises:
determining, by the operating system, whether the sleep timer is expired;

responsive to the operating system determining the sleep timer is expired, the operating system printing a sleep timer expiration error, and ending the automating manual reconfiguration and verification process; and responsive to the operating system determining the sleep timer is not expired, obtaining, by the test program, states of the one or more processing units that are subject to the one or more reconfiguration tests, and determining whether results of the one or more reconfiguration tests are correct; and printing one or more reconfiguration test failure error messages for error analysis and correction when the results of the one or more reconfiguration tests are not correct.

17. The computer program product of claim 15, wherein the method further comprises:

receiving, by the automation program, the one or more reconfiguration tests request from the test program through the MSGLOG API, while the automation program holding the MSGLOG API lock;

performing, by the automation program, the one or more reconfiguration tests request manually on the one or more processing units of the computer system using an LPAR partition's reconfiguration panels of a support element; and waking, by the automation program, the test program up before the sleep timer expires.

18. The computer program product of claim 15, wherein the MSGLOG API allows the test program to automatically perform the one or more reconfiguration tests using the automation program through the MSGLOG API.

19. The computer program product of claim 15, wherein the MSGLOG API comprises an MSGLOG buffer, and wherein updating the MSGLOG buffer comprising holding the MSGLOG API lock to avoid seeing partial or overwritten entries.

20. The computer program product of claim 19, wherein the MSGLOG API lock should not be held while holding other computer system and/or device locks to avoid system contention, deadlock detection and deadlock recovery.

* * * * *